Feb. 26, 1929.　　　　　　　　　　　　　　　　　　　　1,703,387
C. E. BRAUN
MEANS FOR MEASURING THE LENGTH, SPEED, AND CONTINUITY OF WEBS
Filed July 27, 1922
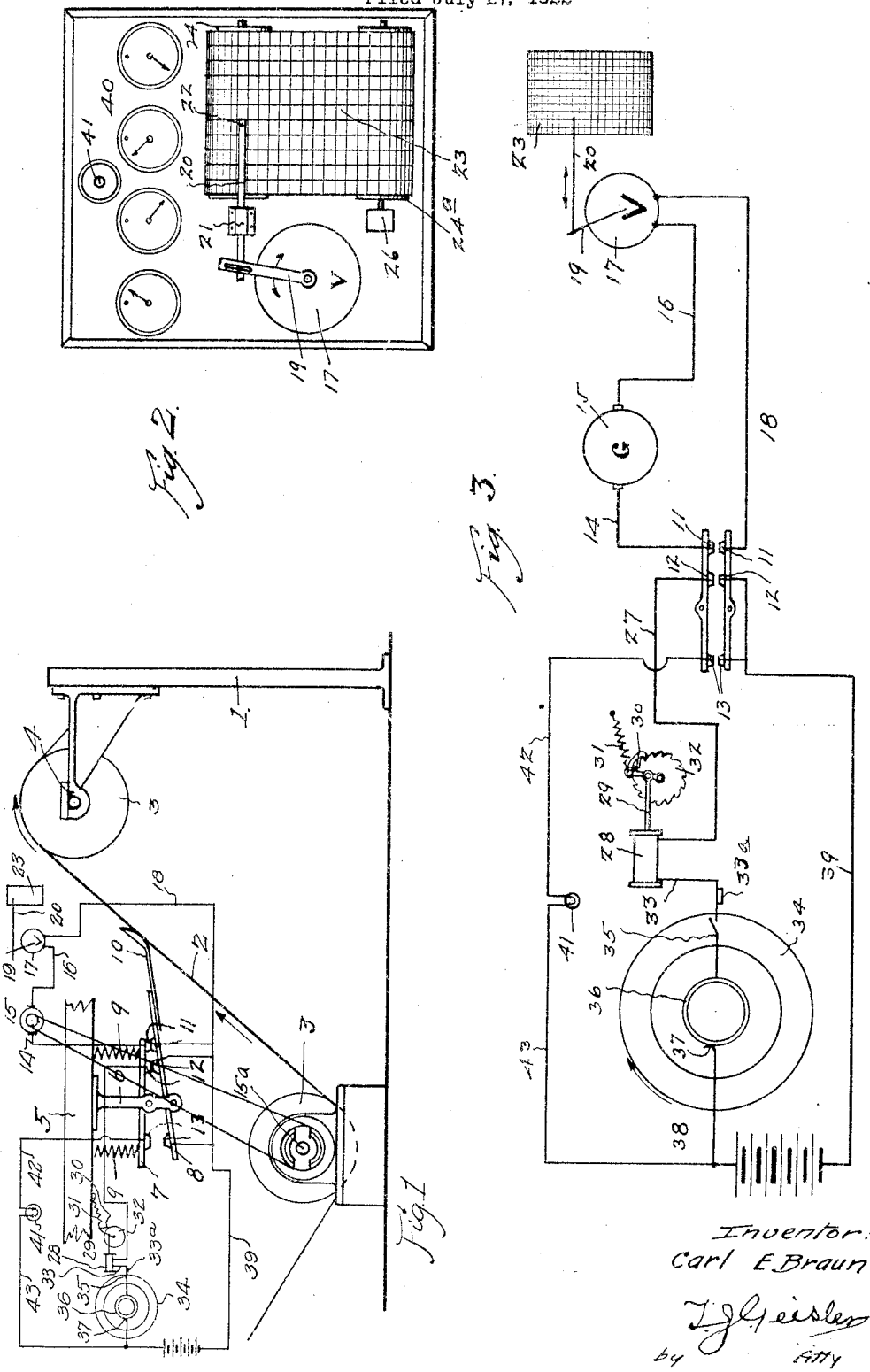
Inventor:
Carl E. Braun Patented Feb. 26, 1929.

1,703,387

UNITED STATES PATENT OFFICE.

CARL E. BRAUN, OF CAMAS, WASHINGTON.

MEANS FOR MEASURING THE LENGTH, SPEED, AND CONTINUITY OF WEBS.

Application filed July 27, 1922. Serial No. 577,957.

My invention relates to means for measuring the length, speed and continuity of a web of material.

Indicating devices of this character, as heretofore constructed, have been actuated by a driven roller on the machine, which is in turn driven by the passing of the moving web. It can be readily seen that when the web is broken the driven roll will rotate several times before it is brought to rest, due to its inertia and the speed at which it is driven. This does not therefore give an accurate check upon the material, as arbitrary deductions have to be made for each break and also connections have to be made for slippage between the web of material and the roll.

These machines are also partially mechanical in their operation and therefore the recording device can not be placed at some distant point as in the superintendent's office, for instance, but must be mounted adjacent the machine. But, in my device the recording instruments can be placed any distance from the machine because the connections between said recording devices and the moving web are wholly electrical. The instruments from all of the machines can be placed together for this reason and can be watched over by one individual who can note the amount of the output and the rate of output, and the warnings indicated by these devices show when the machines break down.

The object of my invention is to provide an all electric indicating and recording device which will measure in lineal units the amount of web passing a given point both as to rate and amount of output and which will stop the indicating devices and preferably at the same time sound an alarm the instant a break occurs in the web of material being measured.

A further object is to provide a device which is especially adapted for paper making machines which will measure their output, and also provide a recording device which also records the rate at which the machine travels at all times during the day.

To this end my invention comprises an electric meter, electrically operated computing device, and an electrically operated alarm, and the electric circuits of these devices are controlled by a switch provided with a control member bearing on and supported by a span of the web. These devices are so arranged that the electric circuits of the electric meter and the computing device are closed and the electric circuit of the alarm are open when the control member of said switch is supported by said span of web and these circuits will be oppositely arranged when said span of web fails to support said control member, thus interrupting the operation of the indicating devices and sounding the alarm when an abnormal condition in the feeding of the web exists.

The details of construction and operation and incidental features of my invention are hereinafter fully described and illustrated in the accompanying drawings, in which:

Fig. 1 is a diagrammatic representation of the switch which controls my machine, in place riding on a taut web of paper;

Fig. 2 is a plan view of one type of recording instrument which can be connected with my device; and Fig. 3 is a diagram of the electrical system of my device.

My invention is adapted to be fitted to a frame 1 of a machine which carries a moving web of material 2, and is specifically devised to measure the paper which passes thru a paper making machine. The paper is mounted over driven rolls 3 which are mounted in suitable bearings 4 mounted on the frame 1. The paper passing over the roll is stretched taut between these rolls. The control arm 10 of the switch 5 rests on this paper between two of the driven rolls and is positioned so that when the paper is taut the switch will be held in operating position but when the paper is slackened or broken the switch will be thrown from its operating position to its inoperative position and will actuate an alarm. The switch is made up of an upright piece 6 on which are pivotally mounted horizontal pieces 7 and 8. The pivoted horizontal member 7 is yieldingly held by springs 9 which tend to hold the member horizontal. The member 8 is allowed to hang free and has a control arm 10 on one end, which overbalances the opposite end thus when the spoon is not supported it will fall of its own weight.

Co-operating contact points 11, 12 and 13 are carried by these horizontal members, contacts 11 and 12 being held together when the spoon is supported by the moving web and are broken and contact 13 is made when the paper is broken or slackened and the spoon is allowed to fall. Contact 11 controls the flow of electricity through the line 14 which is connected with a generator 15 which is mounted so as to be rotated by the end of the shaft 15$^a$ on which one driven roll 3 is mounted. The generator is connected in series with the volt meter 17 by the line 16. The other side of the volt meter is connected to the bottom half of the contact 11 by the line 18. The volt meter is a standard recording volt meter and its arm 19 is rotated in a clockwise direction by an increase in current in the line due to the increase in rotation of the generator 15. The arm 19 is connected to the rod 20 which is slidably mounted in the bracket 21. A stylus 22 is fastened to the end of the arm 21 and is adapted to record on the moving chart 23. The chart 23 is wound around the rollers 24 and 24$^a$. The roller 24$^a$ is actuated by a clock mechanism 26 which moves the chart at fixed speed. The chart has longitudinal and transverse lines, the longitudinal lines designating the speed at which the paper is made and the transverse lines corresponding with the hour of the day at which the machine is running. It can be seen that the faster the paper is run the greater potential the generator will develop, therefore the farther the arm of the volt meter will be extended in a clockwise direction. The arm being connected to the horizontally movable arm 20 will cause the stylus to be moved to the right as shown in Fig. 2 and thus will register farther towards the right hand edge of the chart.

The line 27 connects the upper point of contact 12 with the winding of the solenoid 28. The armature 29 of the solenoid is pivotally attached to the pawl mechanism 30. When the solenoid is energized it draws this armature back and moves the pawl mechanism one notch. When the current is released the armature is returned to its normal position by the action of the spring 31. The pawl is then in position to draw the ratchet 32 forward another tooth. The other end of the solenoid winding is connected by the line 33 to the fixed contact 33$^a$. The roll 34 has a rotating contact 35 positioned so that when the roll rotates the rotating contact will strike the fixed contact once each rotation. The line contact is attached to a commutator 36 on the shaft of the roll and a brush 37 is in constant contact with the commutator. The line 38 connects the battery to the brush 37. The other side of the battery is connected to the lower point of the contact 12 by the line 39, thus making the circuit when the contact points are closed. It can be seen that when the contact points are closed the solenoid will be energized once each revolution of the driven wheel 34 and thus the ratchet will correspondingly be rotated one tooth.

This ratchet mechanism actuates a series of dials 40 which are geared as ordinary meter dials, first being for units, second for tens, third for hundreds, and fourth for thousands, or any similar designations. When the circumference of the roll is determined it is easy to figure the lineal feet of paper passed thereby because the circumference of the roll will be in contact with the paper constantly and therefore the number of rotations of the roll multiplied by its circumference will correspond with the lineal feet of the paper passed thru the machine. Of course, it is also practical to calibrate the indicators so that they will register directly in lineal feet of material passing.

Contact 13 is normally open but is closed when the paper in the machine is slacked or broken. The upper part of the contact 13 is connected to the signal light 41 by the line 42. The other side of the light 41 is connected to the battery by the line 43. The circuit from the other side of the battery is made thru the line 39 which is also connected to the lower point of contact 12.

I claim:

1. Means for measuring a continuous web comprising an electric generator, a rotatable member connected to said generator, an electrically operated measuring instrumentality energized by said generator, means for supporting a section of the web in tension, a switch in the electric circuit of said instrumentality, said switch including a member arranged to bear on said tensioned section thereby to close the said electric circuit whereby said electric circuit is opened and said instrumentality rendered inoperative when said tensioned section of the web breaks.

2. Means for measuring a continuous web of material, comprising means for supporting a section of said web substantially taut, a roller arranged to be revolved by frictional contact with said taut section of web, an electric generator driven by the rotation of said roller, an electrically operated measuring instrumentality energized by said generator, a switch in the electric circuit of said instrumentality, a member operating said switch arranged to bear on said taut section of the web, thereby to close the electric circuit whereby said electric circuit is opened and said instrumentality rendered inoperative when said taut section of web breaks.

3. Means for measuring a continuous travelling web of material, comprising means for supporting a section of the web in a plane, an electrically actuated measuring instrument energized contemporaneously with the travel of said web; a switch in the electric circuit of said measuring instrument, said switch held closed by said web section, whereby the opening of said switch will indicate the rupture of said web section.

4. In means for measuring a continuous web tensioned by being drawn over spaced supports, a rotatable member over which said web is drawn and which is rotated by the web, an electric generator driven by said member, an electrically actuated measuring device, and a switch in the electric circuit of said measuring device, said switch having a member supported by said web when in tension whereby said electric circuit is broken when the tension of said web is released.

CARL E. BRAUN.